United States Patent Office 2,717,269
Patented Sept. 6, 1955

2,717,269
RECOVERY OF META-2-XYLIDINE

Stanley F. Birch, Frederick A. Fidler, and Ronald A. Dean, Sunbury-on-Thames, England, assignors to The British Petroleum Company Limited No Drawing. Original application May 21, 1947, Serial No. 749,598. Divided and this application September 8, 1952, Serial No. 308,508

Claims priority, application Great Britain May 24, 1946

2 Claims. (Cl. 260—582)

The present invention relates to the recovery of meta-2-xylidine from coal tar xylene.

Xylidines, which are used extensively in the manufacture of dye stuffs and fine chemicals, are usually obtained by nitrating coal-tar xylene, and reducing the material so obtained to yield a mixture of the amines. These processes are well known in the art. The resulting amine mixture is treated with acetic acid, and the acetate of meta-4-xylidine is separated and the amine regenerated. The residue after separation of the acetate of meta-4-xylidine is treated with hydrochloric acid, and the hydrochloride of para-xylidine is separated and obtained in a pure state by re-crystallisation from water.

In the following description the liquors remaining after the re-crystallisation of para-xylidine hydrochloride from water are referred to as "mother liquors," and the residue remaining after the separation of meta-4-xylidine and crude para-xylidine hydrochloride, as hereinbefore described, is referred to as "xylidine residues." The known process may be represented diagrammatically as follows:

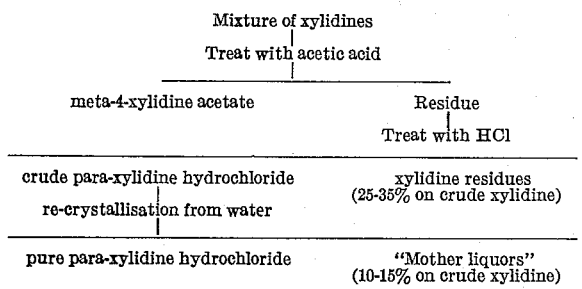

It is the usual present day practice to treat the original mixture of xylidines for the recovery therefrom of meta-4-xylidine and para-xylidine and to regard the mother liquors and xylidine residues as waste products that are not further treated. Since the mother liquors amount to 10–15% of the crude xylidines and the xylidine residues amount to 25–35% of the crude xylidines, the present day practice is wasteful.

We have found that by a simple method it is possible to recover substantial yields of meta-2-xylidine from the above referred to mother liquors:

According to the present invention the xylidine mother liquors from the crystallisation of para-xylidine hydrochloride are treated with alkali and the amines regenerated. The xylidines thus obtained are fractionated in an efficient column having the equivalent of at least twenty actual plates operated at a reflux ratio of not less than 15:1 and under reduced pressure generally not exceeding 50 mm. mercury pressure, for the production of a light fraction boiling up to about 96° C. at 10.5 mm. of mercury, which light fraction contains about 70 to 75% of meta-2-xylidine. The crude meta-2-xylidine thus obtained may be further concentrated and purified according to known methods as by means of organic derivatives such as the formyl compound or through a salt formed with a mineral acid.

Preferably the xylidine mother liquors are admixed with aqueous sodium hydroxide solution and steam distilled for the regeneration of the free amines prior to fractional distillation in accordance with the process of the present invention.

The process of the present invention is illustrated but in no way limited by the following example:

Example

The amines recovered from the mother liquors remaining after the recrystallisation of p-xylidine hydrochloride as hereinfore described were distilled in a fractionating column equivalent to about 20 theoretical plates, and the distillation was carried out at a pressure of 10.5 mm. of mercury. The fraction distilling between 94° and 96° was collected and proved to be substantially meta-2-xylidine. This fraction comprised 52% of the whole. The discarded fractions from this distillation may be recycled for example for the crystallisation of para-xylidine hydrochloride, or to the hydrochloric acid treatment of the xylidines.

By the present process, a greater recovery of meta-2-xylidine is obtained by recovering the meta-2-xylidine from the p-xylidine recrystallisation medium than from the original p-xylidine crystallisation medium. This application is a divisional application of application Serial Number 749,598, filed May 21, 1947, now Patent No. 2,615,047.

We claim:

1. A process for the recovery of meta-2-xylidine from xylidine mother liquors, said xylidine mother liquors having been obtained by treating a crude mixture of xylidines with acetic acid to form the acetate of meta-4-xylidine and a residue, separating the acetate of meta-4-xylidine from the residue, treating the residue with hydrochloric acid to form crude para-xylidine hydrochloride and xylidine residues, separating said para-xylidine hydrochloride by recrystallisation from water obtaining pure para-xylidine hydrochloride and xylidine mother liquors and separating said mother liquors, which comprises regenerating free amines from said mother liquors by treatment with alkali and fractionally distilling said mother liquors in a fractionating column having the equivalent of at least 20 theoretical plates and operated at a reflux ratio of not less than 15.1 and under a pressure not exceeding 50 mm. pressure of mercury to yield a fraction having a final boiling point not exceeding 96° C. at 10.5 mm. pressure of mercury and consisting essentially of meta-2-xylidine.

2. A process as defined in claim 1 wherein the xylidine mother liquor is admixed with an aqueous solution of sodium hydroxide and steam for regeneration of the free amine prior to the fractional distillation.

References Cited in the file of this patent

UNITED STATES PATENTS 2,615,047     Birch et al. _____ Oct. 21, 1952

OTHER REFERENCES

Hodgkinson, et al. "Jour. Chem. Soc." (London), 1900, vol. 77, pp. 65–68.